United States Patent
Nanri et al.

(10) Patent No.: US 8,807,298 B2
(45) Date of Patent: Aug. 19, 2014

(54) DISK BRAKE AND METHOD OF PRODUCING THE SAME

(75) Inventors: Keisuke Nanri, Minami-ALPS (JP);
Junichi Nagasawa, Kamakura (JP);
Yuichi Kobayashi, Sagamihara (JP);
Yoshimasa Matsui, Yokohama (JP);
Kiyotaka Nomura, Kofu (JP); Jun Takahashi, Minami-ALPS (JP)

(73) Assignee: Hitachi, Ltd., Tokyo (JP)

( * ) Notice: Subject to any disclaimer, the term of this patent is extended or adjusted under 35 U.S.C. 154(b) by 760 days.

(21) Appl. No.: 12/232,726

(22) Filed: Sep. 23, 2008

(65) Prior Publication Data
US 2009/0101454 A1    Apr. 23, 2009

(30) Foreign Application Priority Data

Oct. 22, 2007  (JP) ................................. 2007-274385

(51) Int. Cl.
| | | |
|---|---|---|
| F16D 55/02 | (2006.01) | |
| F16D 55/228 | (2006.01) | |
| F16D 121/02 | (2012.01) | |
| F16D 125/04 | (2012.01) | |
| F16D 55/00 | (2006.01) | |

(52) U.S. Cl.
CPC .......... *F16D 55/228* (2013.01); *F16D 2250/00* (2013.01); *F16D 2250/0076* (2013.01); *F16D 2121/02* (2013.01); *F16D 2125/04* (2013.01); *F16D 2250/0092* (2013.01); *F16D 2055/0091* (2013.01); *F16D 2055/002* (2013.01)
USPC .......................... 188/73.1; 188/71.1; 188/370

(58) Field of Classification Search
None
See application file for complete search history.

(56) References Cited

U.S. PATENT DOCUMENTS

| | | | | |
|---|---|---|---|---|
| 3,424,276 A | * | 1/1969 | Robinette | 188/72.2 |
| 3,490,343 A | * | 1/1970 | Afanador et al. | 92/168 |
| 3,497,038 A | * | 2/1970 | Anders et al. | 188/370 |

(Continued)

FOREIGN PATENT DOCUMENTS

| | | | | |
|---|---|---|---|---|
| DE | 3245157 A1 | * | 6/1984 | B23K 31/02 |
| GB | 2 131 507 | | 6/1984 | |

(Continued)

OTHER PUBLICATIONS

European Search Report (in English language) issued Feb. 19, 2009 in European Patent Application No. 08 01 7109.

(Continued)

*Primary Examiner* — Thomas Irvin
(74) *Attorney, Agent, or Firm* — Wenderoth, Lind & Ponack, LLP

(57) ABSTRACT

A disk brake is provided which is free from problems attributed to the obverse-reverse orientation of a cover member as installed. A cylinder portion (21) slidably accommodating a piston is formed from a plate-shaped cover member (43) constituting the bottom thereof and a caliper body main part (46) having an opening (45) that is closed with the cover member (43). The cover member (43) is joined to the caliper body main part (46) to close the opening (45). A projection (60) is provided on one side of the cover member (43) that faces inside the cylinder portion (21), and a blind hole (61) is provided on the other side of the cover member (43). When the cover member (43) has been installed in the normal orientation, the blind hole (61) remains after the outer surface of the bottom of the caliper body has been subjected to face cutting after the installation of the cover member (43).

13 Claims, 12 Drawing Sheets

(56) References Cited

U.S. PATENT DOCUMENTS

| | | | |
|---|---|---|---|
| 4,294,336 A * | 10/1981 | Shimizu | 188/72.4 |
| 5,277,279 A * | 1/1994 | Shimura | 188/72.5 |
| 5,460,317 A * | 10/1995 | Thomas et al. | 228/112.1 |
| 5,480,847 A * | 1/1996 | Derriman et al. | 501/128 |
| 5,499,701 A * | 3/1996 | Harinaga | 188/72.4 |
| 5,575,358 A * | 11/1996 | McCormick | 188/71.6 |
| 5,615,754 A * | 4/1997 | Kobayashi et al. | 188/73.35 |
| 5,624,588 A * | 4/1997 | Terawaki et al. | 219/124.34 |
| 6,045,944 A * | 4/2000 | Okada et al. | 429/163 |
| 6,092,631 A * | 7/2000 | Matsuzaki et al. | 188/72.5 |
| 6,175,778 B1 * | 1/2001 | Xu et al. | 700/203 |
| 6,367,595 B1 * | 4/2002 | Mori et al. | 188/73.1 |
| 6,502,673 B1 * | 1/2003 | Toriyama | 188/218 A |
| 6,629,806 B1 * | 10/2003 | Santorius et al. | 409/132 |
| 6,786,388 B2 * | 9/2004 | Ezumi et al. | 228/112.1 |
| 7,481,303 B2 * | 1/2009 | Matsuzaki | 188/72.5 |
| 7,950,503 B2 * | 5/2011 | Shigeta et al. | 188/72.1 |
| 7,950,504 B2 | 5/2011 | Nanri et al. | |
| 2002/0166736 A1 * | 11/2002 | Yunba | 188/72.5 |
| 2005/0115780 A1 * | 6/2005 | Nanri | 188/73.46 |
| 2005/0211508 A1 | 9/2005 | Roupp | |
| 2006/0175156 A1 | 8/2006 | Sato et al. | |
| 2007/0199772 A1 * | 8/2007 | Nanri et al. | 188/71.1 |
| 2007/0227838 A1 * | 10/2007 | Shigeta et al. | 188/72.7 |

FOREIGN PATENT DOCUMENTS

| | | |
|---|---|---|
| JP | 59-113328 | 6/1984 |
| JP | 8-312696 | 11/1996 |
| JP | 2000-145836 | 5/2000 |
| JP | 2001-55257 | 2/2001 |
| JP | 2002-257166 | 9/2002 |
| JP | 2003-148524 | 5/2003 |
| JP | 2007-10136 | 1/2007 |
| JP | 2007-225058 | 9/2007 |
| WO | 2007/077206 | 7/2007 |

OTHER PUBLICATIONS

Japanese Office Action (with English translation) mailed Jun. 7, 2011 in corresponding Japanese Patent Application No. 2007-274385.

* cited by examiner

DISK BRAKE AND METHOD OF PRODUCING THE SAME

BACKGROUND OF THE INVENTION

The present invention relates to a disk brake and a method of producing the disk brake.

Disk brakes used to brake the wheels of vehicles or the like have a structure in which a cylinder is provided on a caliper and a piston accommodated in a bore of the cylinder presses a brake pad against a disk upon receiving a hydraulic pressure.

There has been devised a disk brake of the above-described type in which the cylinder is divided into a cover member constituting the bottom of the cylinder and a tubular cylinder body having an opening that is closed with the cover member (see Japanese Patent Application Publication No. 2007-10136). The opening of the cylinder body is closed with the cover member after the interior of the cylinder body has been machined through the opening.

The cover member of the above-described disk brake has a projection formed on a side thereof that faces inside the cylinder to prevent the piston from sticking fast to the cover member at the bottom of the cylinder when a brake fluid is filled into the cylinder under a vacuum.

SUMMARY OF THE INVENTION

The above-described disk brake of the related conventional art requires an inspection regarding the installed orientation of the cover member during production process because there is a possibility of the cover member being mistakenly fitted to the cylinder body reversely in terms of the obverse-reverse orientation.

Under these circumstances, an object of the present invention is to provide a disk brake capable of facilitating or dispensing with the inspection regarding the installed orientation of the cover member, i.e. whether or not the cover member has been installed correctly in the normal obverse-reverse orientation.

The present invention provides a disk brake having a cylinder slidably accommodating a piston that presses a brake pad against a disk, in which the cylinder is formed from a plate-shaped cover member constituting the bottom of the cylinder and a cylinder body having an opening that is closed with the cover member, and in which the cover member is joined to the cylinder body to close the opening. In the disk brake, a projection is provided on one side of the cover member that faces inside the cylinder, and a blind hole is provided on the other side of the cover member.

In addition, the present invention provides a method of producing a disk brake having a cylinder slidably accommodating a piston that presses a brake pad against a disk, in which the cylinder is formed from a plate-shaped cover member constituting the bottom of the cylinder and a cylinder body having an opening that is closed with the cover member, and in which the cover member is joined to the cylinder body to close the opening. The disk brake producing method includes the steps of forming a projection on one side of the cover member and a blind hole on the other side of the cover member, disposing the cover member such that the projection faces inside the cylinder and, in this state, joining the cover member to the peripheral wall of the opening of the cylinder body, and face-cutting the other side of the cover member and a portion of said cylinder body that adjoins to said the other side of said cover member to remove burrs from the joint therebetween.

In addition, the present invention provides a method of producing a disk brake having a cylinder slidably accommodating a piston that presses a brake pad against a disk, in which the cylinder is formed from a plate-shaped cover member constituting the bottom of the cylinder and a cylinder body having an opening that is closed with the cover member, and in which the cover member is joined to the cylinder body to close the opening. The disk brake producing method includes the steps of forming a first projection on one side of the cover member and a second projection on the other side of the cover member, disposing the cover member such that either one of the first and second projections faces inside the cylinder and, in this state, joining the cover member to the peripheral wall of the opening of the cylinder body, and face-cutting the side of the cover member which faces outside said cylinder and a portion of the cylinder body that adjoins to the side of said cover member which faces outside said cylinder to remove burrs from the joint therebetween.

Thus, it is possible according to the present invention to facilitate or dispense with the inspection regarding the installed orientation of the cover member, i.e. whether or not the cover member has been installed correctly in terms of the obverse-reverse orientation.

DETAILED DESCRIPTION OF THE PREFERRED EMBODIMENTS

[First Embodiment]

A first embodiment of the present invention will be explained below with reference to FIGS. 1 to 13.

Figure 1:
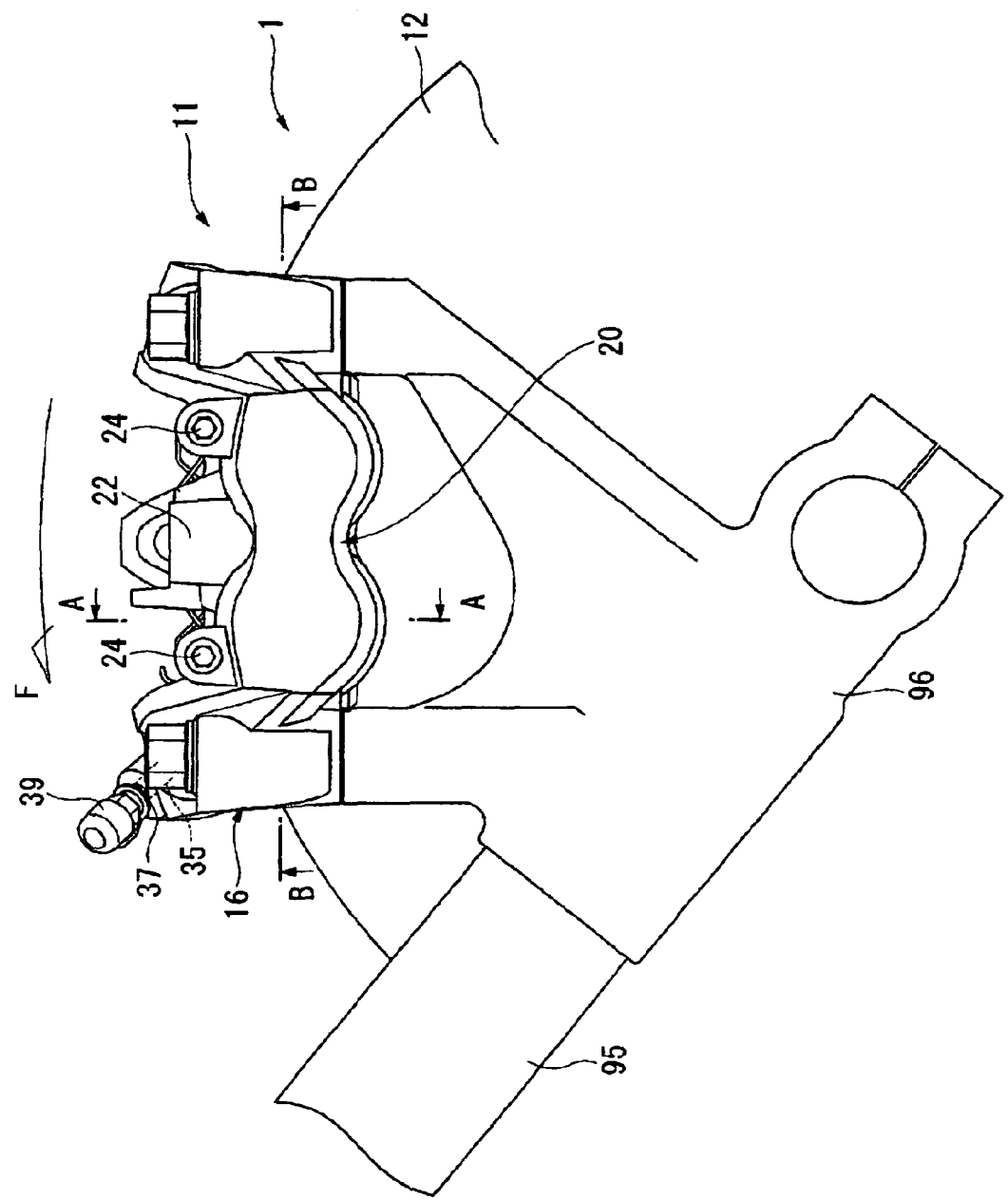
FIG. 1 is a front view of a disk brake according to a first embodiment of the present invention as it is mounted on a vehicle body.

FIG. 1 shows an example in which a disk brake 1 according to the present invention is applied to a motorcycle. The disk brake 1 has a disk 12 that rotates together as one unit with a wheel (rotating member) to be braked. The disk brake 1 further has a caliper 11 that applies a frictional resistance to the disk 12. The caliper 11 is of an opposed piston type caliper having a caliper body 16 that axially extends over the disk 12 and that is secured to a non-rotating part 95 of the vehicle through a bracket 96. The caliper 11 further has two pairs of pistons 17 (see the sectional view of FIG. 2, in which only one pair of pistons 17 are shown) that are slidably provided in the caliper body 16. The pistons 17 of each pair are opposed to each other across the disk 12. It should be noted that the following description will be made of the disk brake 1 as mounted on the vehicle, and that the radial direction of the disk 12 in the mounted state is referred to as "the disk radial direction". Further, the axial direction of the disk 12 is referred to as "the disk axial direction", and the circumferential direction of the disk 12 as "the disk circumferential direction". The arrow F in FIG. 1 indicates the rotational direction of the disk 12 when the vehicle is traveling forward.

The caliper body 16 has, as shown in FIGS. 1 to 7, an outer cylinder portion 20 disposed at the outer side of the disk 12 (i.e. at the side of the disk 12 remote from the wheel) and an inner cylinder portion (cylinder) 21 disposed at the inner side of the disk 12 (i.e. at the side of the disk 12 closer to the wheel). The caliper body 16 further has a disk pass portion 22 that connects together the outer cylinder portion 20 and the inner cylinder portion 21 at the radially outer side of the disk 12. The caliper body 16 is provided with a pair of pad pins 24 spaced from each other in the disk circumferential direction. The pad pins 24 extend between the outer cylinder portion 20 and the inner cylinder portion 21 along the disk axial direction.

The outer cylinder portion 20 and the inner cylinder portion 21 are provided with two pairs of bores 26 spaced from each other in the disk circumferential direction. The bores 26 of each pair are opposed to each other in the disk axial direction (see FIG. 2). The pistons 17 are slidably fitted in the bores 26, respectively. In other words, the outer cylinder portion 20 and the inner cylinder portion 21 are provided with two pairs of pistons 17 spaced from each other in the disk circumferential direction, each pair consisting of two pistons 17 opposed to each other across the disk 12.

Figure 2:
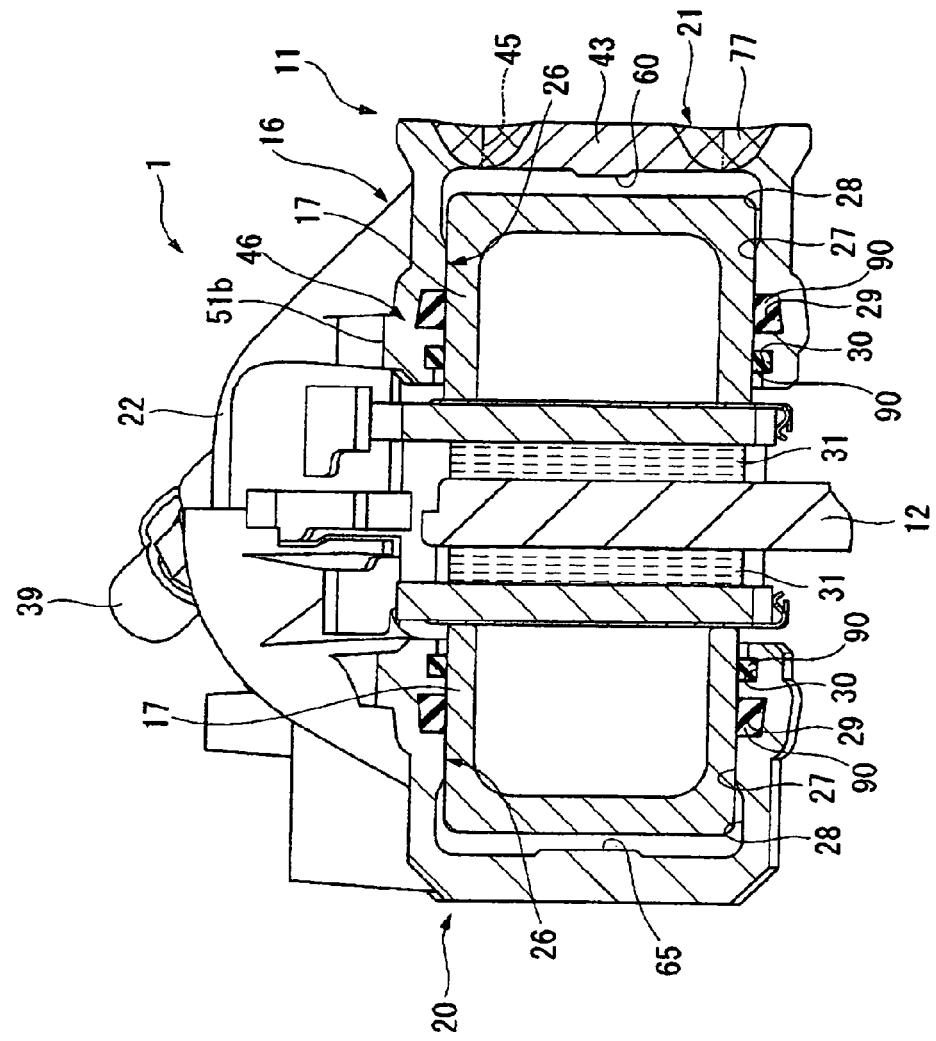
FIG. 2 is a sectional view taken along the line A-A in FIG. 1, showing the disk brake according to the first embodiment of the present invention.
Figure 3:
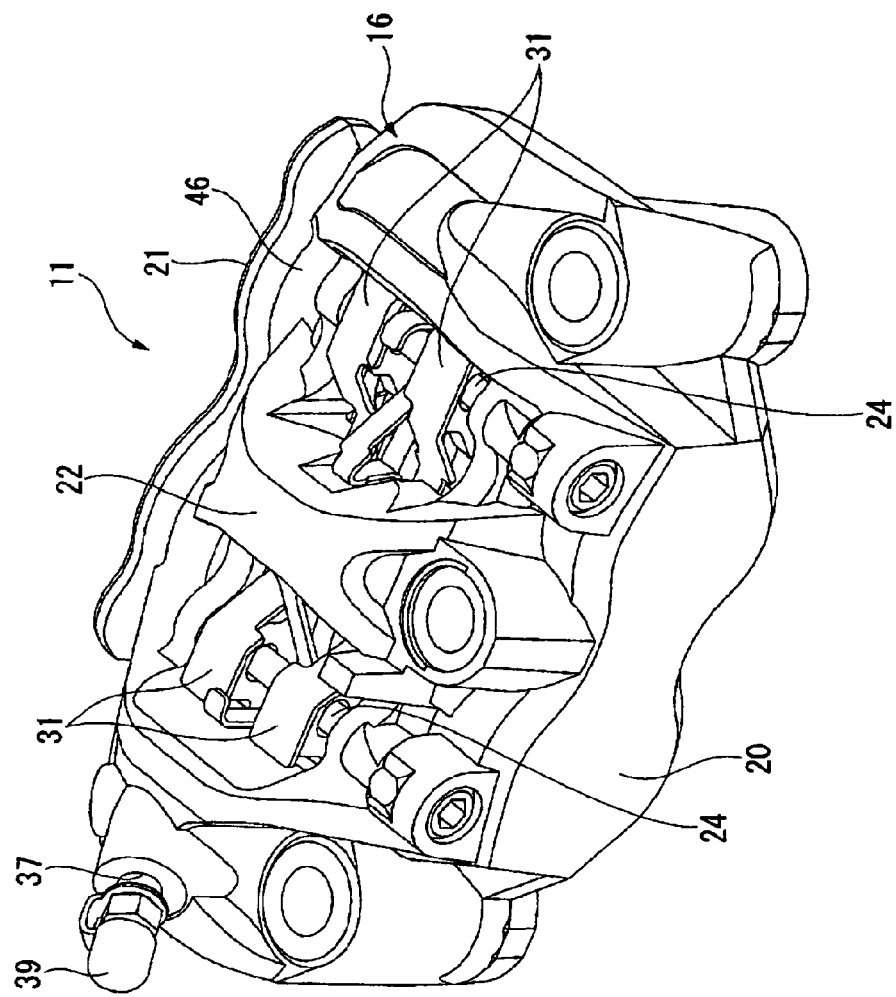
FIG. 3 is a perspective view of a caliper in the first embodiment of the present invention.
Figure 4:
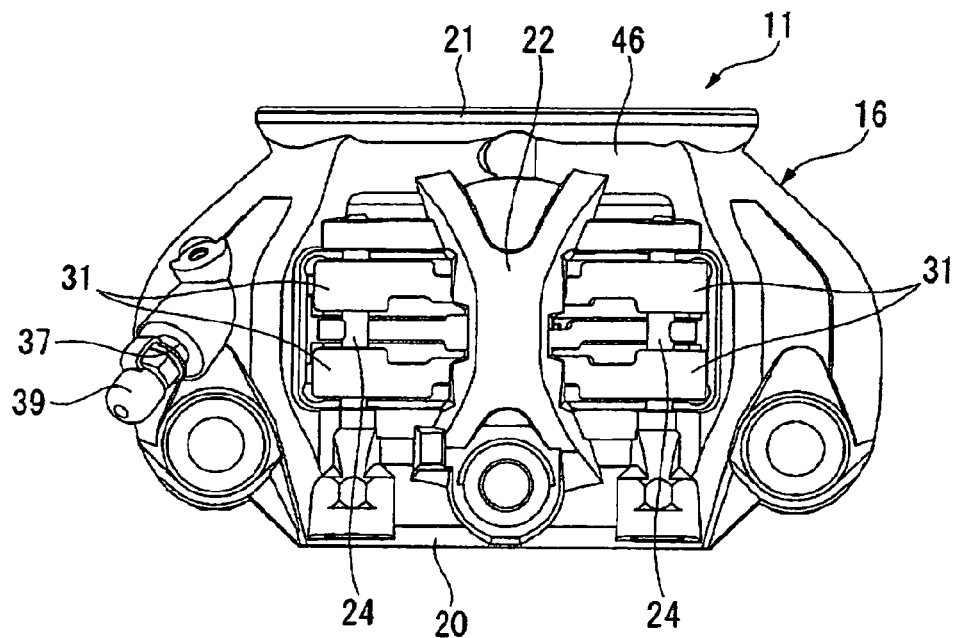
FIG. 4 is a top view of the caliper in the first embodiment of the present invention.
Figure 5:
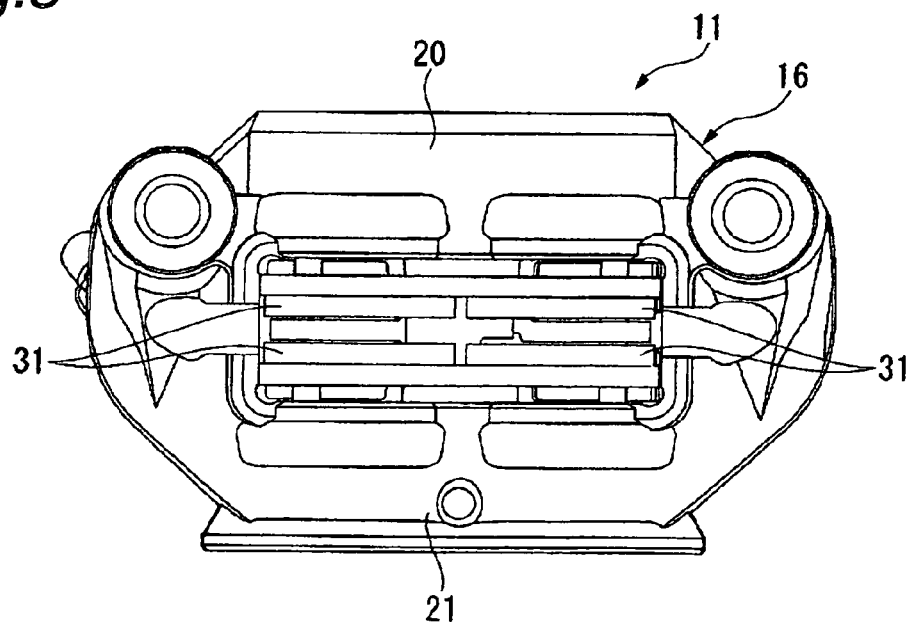
FIG. 5 is a bottom view of the caliper in the first embodiment of the present invention.
Figure 6:
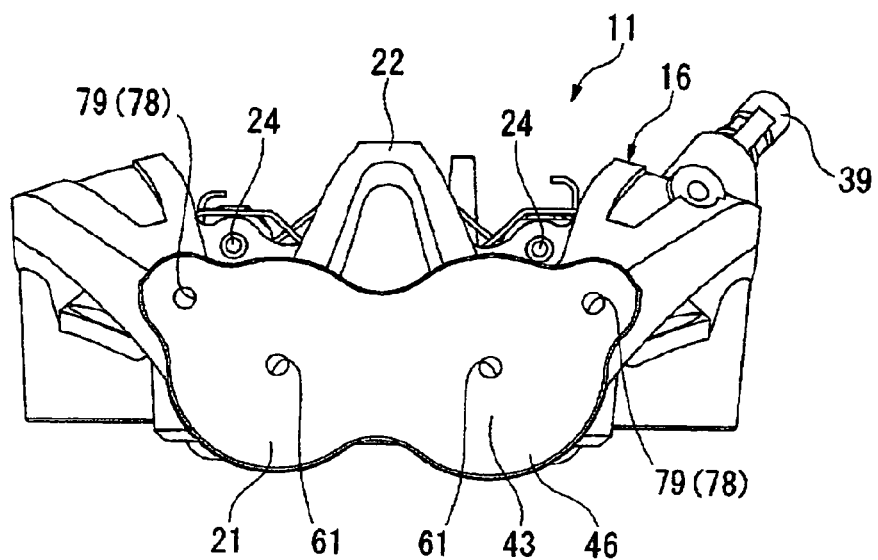
FIG. 6 is a rear view of the caliper in the first embodiment of the present invention.
Figure 7:
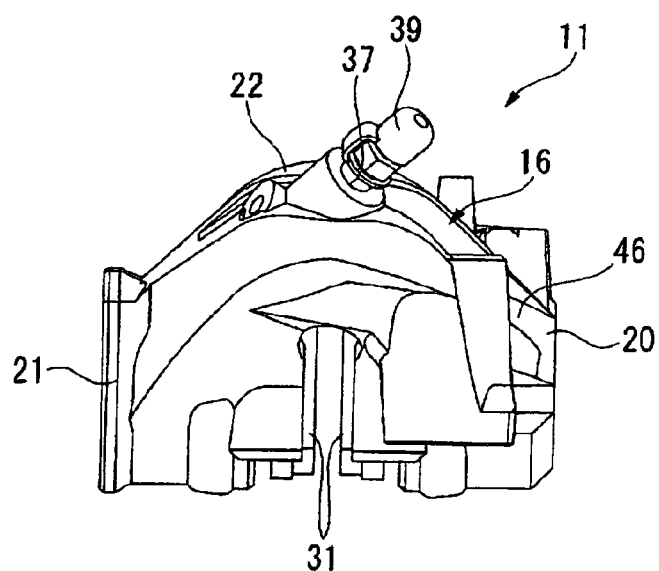
FIG. 7 is a side view of the caliper in the first embodiment of the present invention.

Each bore 26 has, as shown in FIG. 2, a fitting bore portion 27 slidably fitted with a piston 17 and a large-diameter bore portion 28 located at the back of the fitting bore portion 27 and having a larger diameter than that of the fitting bore portion 27. The fitting bore portion 27 has seal circumferential grooves 29 and 30 formed at a substantially intermediate position in the axial direction thereof to retain piston seals 90.

Each pad pin 24 of the caliper body 16 supports a pair of brake pads 31 movably in the disk axial direction. The pads 31 are disposed at both sides of the disk 12 in the disk axial direction and pressed against the disk 12 by being pressed at their back by the pistons 17, respectively. It should be noted that reference numeral 35 denotes a communicating passage for communication between the bores 26 opposed to each other across the disk 12, and reference numeral 39 denotes a bleeder plug that is attached to an inlet 37 communicating with the communicating passage 35.

The caliper body 16, which has the outer cylinder portion 20, the inner cylinder portion 21 and the disk pass portion 22, is integrally formed, for example, of an aluminum alloy, except a part of the bottom of the inner cylinder portion 21. Discrete cover members 43 constitute a part of the bottom of the inner cylinder portion 21. Here, the integrally formed part of the caliper body 16, except a part of the bottom of the inner cylinder portion 21, shall be referred to as "caliper body main part 46". Thus, the caliper body 16 has a caliper body main part 46 having openings 45 and cover members 43 that close the openings 45 of the caliper body main part 46. The caliper body main part 46 and the cover members 43 are integrally joined to each other, for example, by friction stir welding (FSW), which will be explained later. In this embodiment, the part of the caliper body main part 46 that constitutes the inner cylinder portion 21 is the cylinder body.

Each opening 45 of the caliper body main part 46 is formed with a circular configuration coaxial with the associated bore 26 of the inner cylinder portion 21. The inner diameter of the opening 45 is smaller than that of the bore 26. The opening 45 of the caliper body main part 46 is used as a machining opening for performing machining the interior of the caliper body main part 46 after it has been cast. For example, the opening 45 is used as an insertion hole for a cutting tool to cut the fitting bore portion 27, the large-diameter bore portion 28 and the seal circumferential grooves 29 and 30 of the inner and outer cylinder portions 21 and 20 when machining of the opening 45 has been completed, or when the opening 45 is machined immediately after the caliper body main part 46 has been cast.

Figure 8:
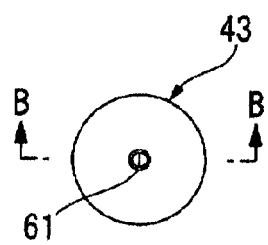
FIG. 8 is a front view of a cover member in the first embodiment of the present invention.
Figure 9:
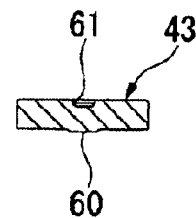
FIG. 9 is a sectional view taken along the line B-B in FIG. 8, showing the cover member in the first embodiment of the present invention.
Figure 10:
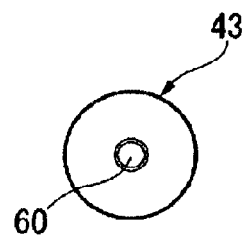
FIG. 10 is a rear view of the cover member in the first embodiment of the present invention.

FIGS. 8 to 10 show one cover member 43 that is fitted to the opening 45 of the inner cylinder portion 21. The cover member 43 is, as shown in these figures, formed in a disk shape from an aluminum alloy or the like, and has a projection 60 in the center of one end surface thereof in the direction of thickness thereof (i.e. axial direction). The cover member 43 further has a blind hole 61 in the center of the other end surface thereof. The cover member 43 is fitted to the opening 45 such that the side thereof provided with the projection 60 faces inside the bore 26 of the inner cylinder portion 21. The projection 60 having a small area limits the retract position of the piston 17 accommodated in the bore 26 when the piston 17 is fully retracted. Specifically, the projection 60 is provided for the following reason. After the disk brake has been mounted on the vehicle, the bore 26 of the caliper 11 is filled with brake fluid after the atmospheric air in the bore 26 has been evacuated (i.e. the brake fluid is filled under a vacuum). In this regard, the projection 60 is provided to prevent the bottom of the piston 17 from sticking fast to the bottom of the cylinder portion 21 due to the evacuation process, which would interfere with the return of the piston 17. It should be noted that the outer cylinder portion 20 also has, as shown in FIG. 2, a projection 65 on the bottom thereof, which has the same function as that of the projection 60 of the cover member 43.

The outer peripheral surface of the cover member 43 extends straight in the axial direction. The outer diameter of the cover member 43 is set slightly smaller than the inner diameter of the opening 45 of the inner cylinder portion 21. The projection 60 and the blind hole 61 of the cover member 43 are each formed in a short-axis cylindrical shape coaxial with the outer peripheral surface of the cover member 43. The blind hole 61 is formed so that the diameter of its inner peripheral wall is smaller than the diameter of the outer peripheral surface of the projection 60. The bottom surface of the blind hole 61 is formed flat in parallel to the general part (the part other than the blind hole 61) of the other end surface of the cover member 43.

The method of producing the disk brake 1 will be explained below.

In the production of the caliper body 16, the caliper body main part 46 and the cover members 43 are individually formed in advance. During the forming process, each cover member 43 is provided with the projection 60 and the blind hole 61 on the opposite end surfaces thereof. The caliper body main part 46, after casting process, is subjected to machining to cut the interior thereof through the openings 45, as has been stated above.

Next, the cover members 43 are disposed in the openings 45 of the caliper body main part 46 so that the side of each cover member 43 provided with the projection 60 faces inside the bore 26. Then, the cover members 43 are temporarily fixed to the caliper body main part 46 by caulking. In this temporary fixing process, each cover member 43 is caulked while confirming that the blind hole 61 in the center of the cover member 43 is coincident with the center of the opening 45.

Thereafter, friction stir welding (FSW) is applied to the joint interfaces between the cover members 43 and the respective peripheral walls of the openings 45.

Figure 11:
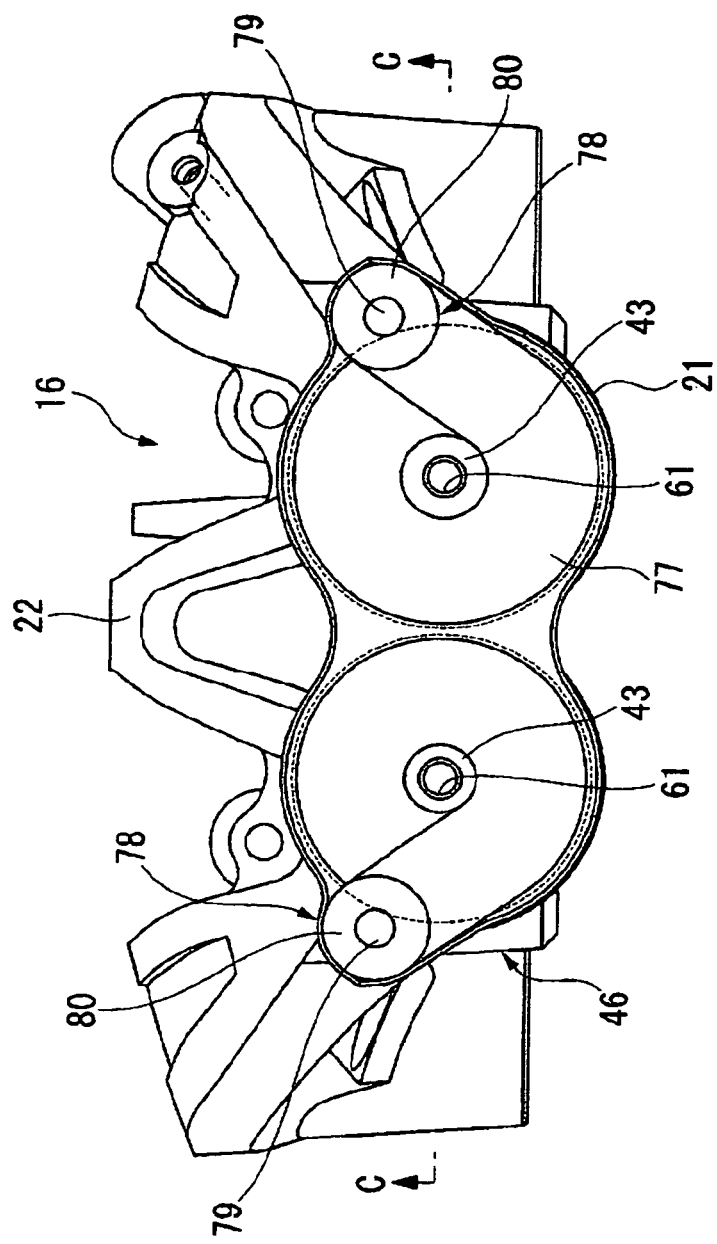
FIG. 11 is a rear view of a caliper body in the first embodiment of the present invention before it is subjected to face cutting.
Figure 12:
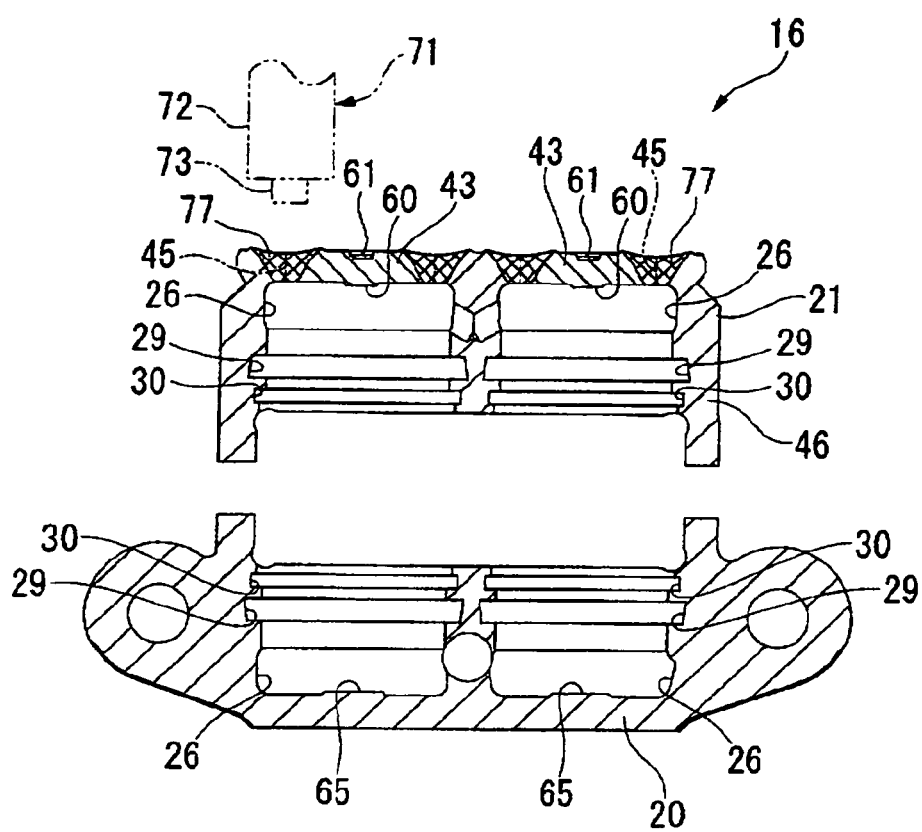
FIG. 12 is a sectional view taken along the line C-C in FIG. 11, showing the caliper body in the first embodiment of the present invention before it is subjected to face cutting.

FIGS. 11 and 12 show the caliper body 16 immediately after the friction stir welding has been applied to the joint interfaces.

In the friction stir welding process, as shown in FIG. 12, a tip shaft portion 73 of a welding tool 71 is continuously moved along the joint interface between each opening 45 and the associated cover member 43 to perform welding in a loop over the entire circumference of the cover member 43. Upon completion of welding the outer periphery of the cover member 43 over the entire circumference thereof, the welding tool 71 is moved to the outside of the joint interface of the cover member 43 along the tangential direction to the circumference of the joint interface thereof. Upon completion of the movement to a predetermined position, the welding tool 71 is withdrawn from the caliper body main part 46.

Thus, the cover members 43 are welded to the openings 45 over the entire circumferences thereof, and, as shown in FIG. 11, residual impressions 78 due to the friction stir welding process are formed on the end surface of the caliper body main part 46. It should be noted that the end surface of the caliper body main part 46 has somewhat undulating weld beads 77 formed around the outer peripheries of the cover members 43, but the residual impressions 78, which are relatively deep recesses, are formed only at the withdrawal points where the welding tool 71 is withdrawn from the caliper body main part 46. Each residual impression 78 consists of a center hole 79 corresponding to the tip shaft portion 73 of the welding tool 71 and a peripheral recess 80 corresponding to the large-diameter shaft portion 72 of the welding tool 71.

Thus, the cover member 43 is joined to the caliper body main part 46 to make a semi-fabricated product of the caliper body 16. Thereafter, the bottom surface (the outer surface of the bottom) of the semi-fabricated caliper body 16 on the side thereof where the openings 45 are provided is visually inspected to check whether or not the blind hole 61 is present in the center of the outer surface of each cover member 43, i.e. whether or not each cover member 43 has been normally installed such that the projection 60 faces inside the bore 26. If it is found by the visual inspection that either or both of the cover members 43 have been mistakenly installed reversely in the obverse-reverse orientation, the semi-fabricated product is removed from the production line at this point of time. At the same time as the visual inspection, the circular arc of each weld bead 77 and the position of the blind hole 61 of the associated cover member 43 are compared with each other by image recognition or the like to evaluate whether or not the friction stir welding has been performed along an appropriate locus.

Figure 13:
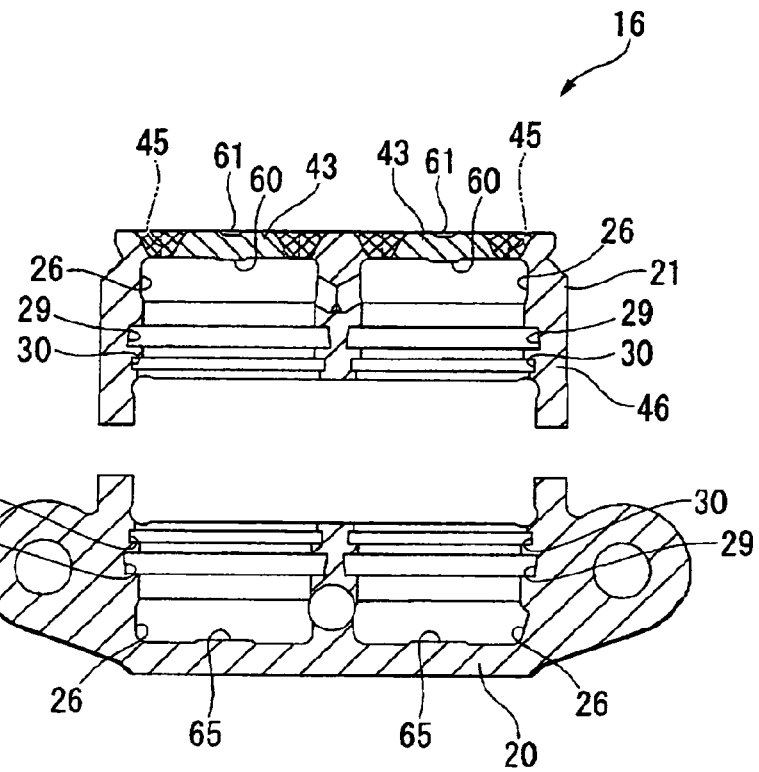
FIG. 13 is a sectional view taken along the line C-C in FIG. 11, showing the caliper body in the first embodiment of the present invention after it has been subjected to face cutting.

Next, the opening 45-side bottom surface of the semi-fabricated caliper body 16 is subjected to face cutting so as to be cut by an amount corresponding to a set thickness (i.e. a thickness smaller than the depth of the blind hole 61 of each cover member 43), thereby removing the weld beads 77 including burrs from the bottom surface of the semi-fabricated product. It should be noted that FIG. 13 shows the caliper body 16 after the face-cutting process.

Thereafter, the opening 45-side bottom surface of the caliper body 16 thus formed is visually inspected to check again whether or not the blind hole 61 remains in the center of the outer surface of each cover member 43. If the blind hole 61 does not remain, it is judged that the cover member 43 has been mistakenly installed reversely in the obverse-reverse orientation, and the caliper body 16 is removed from the production line.

In other words, the margin for cutting in the face-cutting process at the preceding step is less than the depth of the blind hole 61. Therefore, if the cover member 43 has been installed in the normal obverse-reverse orientation, the blind hole 61 remains in the center of the cover member 43 after the face-cutting process. If the cover member 43 has been mistakenly installed reversely in the obverse-reverse orientation, the projection 60 is completely cut off, and the center of the cover member 43 is flat. Therefore, if the blind hole 61 does not remain, the cover member 43 is judged to have been mistakenly installed reversely in the obverse-reverse orientation.

If the blind hole 61 remains in the center of the cover member 43, then the bottom of the blind hole 61 is observed for inspection. If the depth of the blind hole 61 is shallower than a specified value, or if the bottom surface of the blind hole 61 is inclined, it is judged that the cover member 43 has not been appropriately fitted to the caliper body main part 46 in terms of the fitting depth or angle, and the caliper body 16 is removed from the production line.

The caliper body 16 is produced in this way, and thereafter, other components such as pistons 17 and brake pads 31 are assembled to the caliper body 16.

In this embodiment, the present invention is applied to a disk brake of the type having a cylinder slidably accommodating a piston that presses a brake pad, in which the cylinder is formed from a cylinder body having an opening in the bottom thereof and a cover member that closes the opening of the cylinder body. In a conventional disk brake of this type, nothing is provided on the side of the cover member that is exposed to the outside, but a projection is provided only on the side of the cover member that faces inside the cylinder bore. With this conventional disk brake, if the cover member has been mistakenly installed reversely in the obverse-reverse orientation, the erroneous installation of the cover member cannot be recognized from the outside after the end surface has been subjected to face cutting. That is, if the cover member has been mistakenly installed reversely in the obverse-reverse orientation in the conventional disk brake, it is impossible to judge from the external appearance whether the cover member has been normally installed or it has been mistakenly installed reversely, because the projection provided on the outer side of the cover member is cut flat during the face-cutting process.

Further, in the conventional disk brake, in order to judge from the outside of the cylinder body whether or not the cover member has been mistakenly installed reversely in the obverse-reverse orientation, the inspection has to be performed before the face-cutting process. After the face-cutting process, it is possible to check for an error in the installed orientation of the cover member from the inside of the cylinder body. In this case, however, the inspection has to be performed before the piston is assembled into the cylinder body. Thus, the conventional disk brake has the disadvantage that the time for the inspection step is limited to a considerable extent.

In contrast, the disk brake 1 in this embodiment has a projection 60 and a blind hole 61 on the two opposite sides, respectively, of the cover member 43. Therefore, if the cover member 43 has been installed in the normal orientation such that the projection 60 faces inside the bore 26, the blind hole 61 remains on the outer side of the cover member 43 after the face-cutting process. If the cover member 43 has been installed in the reverse orientation, the outer side of the cover member 43 is flat after the face-cutting process. Thus, it is possible to clearly judge from the external appearance whether or not the cover member 43 has been mistakenly installed reversely in the obverse-reverse orientation. Accordingly, the disk brake 1 enables an erroneous installation of the cover member 43 to be found easily. Even after the completion of the disk brake 1 after the cover member 43 has been joined, it is possible to perform an inspection to check for an error in the obverse-reverse orientation of the cover member installed. Thus, there is no restriction in time for the inspection step, and hence the production efficiency can be increased.

Even if the cover member 43 has been installed in the normal obverse-reverse orientation, if the cover member 43 is joined to the caliper body main part 46 in a substantially raised position in the friction stir welding process, the cover member 43 may be cut more than the specified value at the subsequent face-cutting step, resulting in a reduction in wall thickness of the bottom of the caliper body main part 46. In this case also, the caliper body 16 can be surely found to be a defective because of the disappearance of the blind hole 61, and removed from the production line.

The following is a description of advantageous effects of the first embodiment detailed above.

In this embodiment, the present invention is applied to a disk brake having a cylinder slidably accommodating a piston that presses a brake pad against a disk, in which the cylinder is formed from a plate-shaped cover member constituting the bottom of the cylinder and a cylinder body having an opening that is closed with the cover member, and in which the cover member is joined to the cylinder body to close the opening. In this disk brake, a projection is provided on one side of the cover member that faces inside the cylinder, and a blind hole is provided on the other side of the cover member. Therefore, the installed orientation of the cover member can be readily and accurately judged from the presence or absence of the blind hole after the cylinder bottom has been subjected to face cutting. In addition, the time required for the product inspection can be shortened.

Further, in this embodiment, the cover member is joined to the cylinder body by friction stir welding. Therefore, the bottom of the cylinder body can be sealed in a fluid-tight manner with the cover member without using a seal member or the like, and the production cost can be reduced by a reduction in the number of component parts. In addition, a reduction in the wall thickness of the cylinder bottom allows reductions in the overall size and weight of the apparatus.

Further, in this embodiment, the projection and the blind hole are provided in the center of the cover member. Therefore, the projection can be abutted against the center of the bottom of the piston in a well-balanced manner when the piston retracts at the time of filling the brake fluid under a vacuum. In addition, the fitting balance of the cover member can be accurately confirmed from the position of the projection after the cover member has been temporarily fixed or joined to the cylinder body.

In this embodiment, both the projection and the blind hole are circular in shape, and the diameter of the blind hole is set smaller than the diameter of the projection. Therefore, the cover member of the present invention can be formed easily by forging or the like. In addition, a local reduction in wall thickness of the cover member can be eliminated.

Further, in this embodiment, the other side of the cover member (the side that faces outside the cylinder) and a portion of the cylinder body that adjoins to the other side of the cover member are subjected to face cutting so as to be flush with each other. Therefore, it is possible to improve the appearance of the joint between the cylinder body and the cover member after the machining process.

Further, in this embodiment, the blind hole is formed in a cylindrical shape. Therefore, it is possible not only to check whether or not the cover member has been installed in the normal obverse-reverse orientation on the basis of the presence or absence of the blind hole, but also to check for an inclination or other condition of the cover member according to whether or not the bottom surface of the blind hole is inclined, or on the basis of the shape of the blind hole after the face-cutting process.

Further, in the first embodiment, the present invention is applied to a method of producing a disk brake having a cylinder slidably accommodating a piston that presses a brake pad against a disk, in which the cylinder is formed from a plate-shaped cover member constituting the bottom of the cylinder and a cylinder body having an opening that is closed with the cover member, and in which the cover member is joined to the cylinder body to close the opening. According to the present invention, the disk brake producing method has the step of forming a projection on one side of the cover member and a blind hole on the other side of the cover member, the step of disposing the cover member such that the projection faces inside the cylinder and, in this state, joining the cover member to the peripheral wall of the opening of the cylinder body, and the step of face-cutting the other side of the cover member and the portion of the cylinder body that adjoins to the other side of the cover member to remove burrs from the joint therebetween. Therefore, the installed orientation of the cover member can be readily and accurately judged by observing the outer surface of the cover member after the face-cutting process. Particularly, in the face-cutting step, face cutting is performed such that the bottom of the blind hole remains. Consequently, when the cover member has been installed in the normal obverse-reverse orientation, the blind hole remains on the outer surface of the cover member, whereas when the cover member has been mistakenly installed reversely in the obverse-reverse orientation, nothing remains on the outer surface of the cover member. The step of joining the cover member to the peripheral wall of the opening of the cylinder body may be carried out by friction stir welding.

The disk brake producing method of this embodiment further has a locus checking step carried out after the friction stir welding step to check whether or not the locus of the friction stir welding is appropriately centered at the blind hole. Therefore, the welding locus can be accurately evaluated immediately after the friction stir welding step.

The disk brake producing method of this embodiment further has an inspection step carried out before the face-cutting step to check the blind hole to find a possible erroneous installation of the cover member. Accordingly, an error in the installed orientation of the cover member can be found even more reliably, and it is possible to eliminate the execution of unnecessary face cutting.

The disk brake producing method of this embodiment further has a judging step carried out after the face-cutting step to judge from the angle of the bottom surface of the blind hole whether or not the angle of the cover member to the cylinder body is acceptable. Accordingly, it is possible not only to judge whether or not the cover member has been installed in the normal obverse-reverse orientation, but also to evaluate the installed angle of the cover member.

Figure 14:
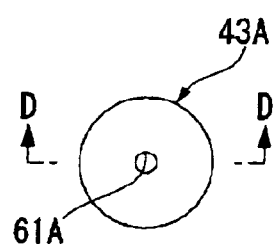
FIG. 14 is a front view of a cover member in a first modification of the first embodiment of the present invention.
Figure 15:
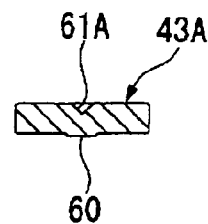
FIG. 15 is a sectional view taken along the line D-D in FIG. 14, showing the cover member in the first modification of the first embodiment of the present invention.
Figure 16:
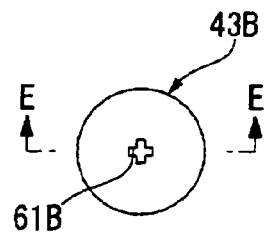
FIG. 16 is a front view of a cover member in a second modification of the first embodiment of the present invention.
Figure 17:
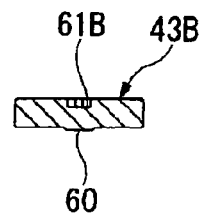
FIG. 17 is a sectional view taken along the line E-E in FIG. 16, showing the cover member in the second modification of the first embodiment of the present invention.

Although in the foregoing first embodiment the blind hole 61 formed on one side of the cover member 43 has a cylindrical shape, the configuration of the blind hole 61 is not necessarily limited thereto but may be a conical shape as shown in FIGS. 14 and 15 or may be a cross-shape as shown in FIGS. 16 and 17. If the blind hole 61 is a conical hole 61A or a cross-shaped hole 61B as shown in these figures, it is possible to evaluate the inclination of the cover member 43A or 43B (i.e. whether or not the angle of the cover member 43A or 43B to the cylinder body is acceptable) from the configuration of the opening of the conical hole 61A or the cross-shaped hole 61B. For example, in the case of the conical hole 61A, the inclination of the cover member 43A can be evaluated from the roundness of the opening. In the case of the cross-shaped hole 61B, the inclination of the cover member 43B can be evaluated from the lengths of the crossing arms of the opening.

Figure 18:
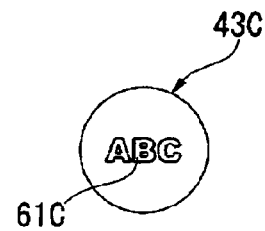
FIG. 18 is a front view of a cover member in a third modification of the first embodiment of the present invention.

As shown by a cover member 43C in FIG. 18, for example, the blind hole 61 may be a symbolic hole 61C in the shape of a symbol such as an alphabetical or numerical symbol representing the type of the caliper body or the cover member, or a lot number. In this case, it becomes unnecessary to put to the cover member or the caliper body an extra symbol representing the type thereof, and hence possible to reduce the number of production steps and to prevent degradation of the appearance.

Further, although in the foregoing first embodiment the cover member 43 is joined to the peripheral wall of the opening 45 of the caliper body main part 46 by friction stir welding, the method of joining the cover member 43 is not necessarily limited to friction stir welding. For example, threads may be cut on the outer peripheral surface of the cover member 43 and on the peripheral wall of the opening 45 of the caliper body main part 46 to join them by thread engagement.

[Second Embodiment]

Next, a second embodiment of the present invention will be explained with reference to FIGS. 19 to 23. It should be noted that members and portions common to the first and second embodiments are referred to in the same way and denoted by the same reference numerals.

Figure 19:
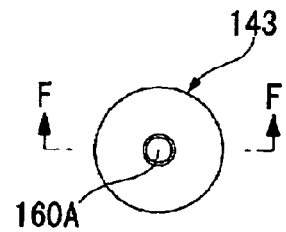
FIG. 19 is a front view of a cover member in a second embodiment of the present invention.
Figure 20:
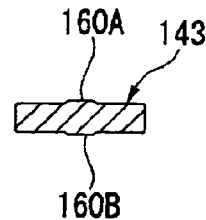
FIG. 20 is a sectional view taken along the line F-F in FIG. 19, showing the cover member in the second embodiment of the present invention.
Figure 21:
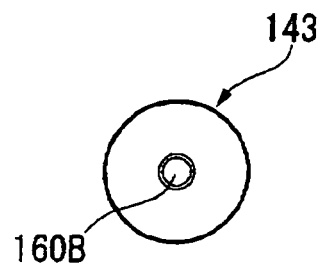
FIG. 21 is a rear view of the cover member in the second embodiment of the present invention.

A cover member 143 is, as shown in FIGS. 19 to 21, formed into a disk shape from an aluminum alloy or the like. The cover member 143 has a first projection 160A in the center of one end surface in the direction of thickness thereof and further has a second projection 160B in the center of the other end surface thereof. The first projection 160A and the second projection 160 B are each formed in a short-axis cylindrical shape of the same size. It should be noted that the rest of the second embodiment is the same as that of the first embodiment.

Figure 22:
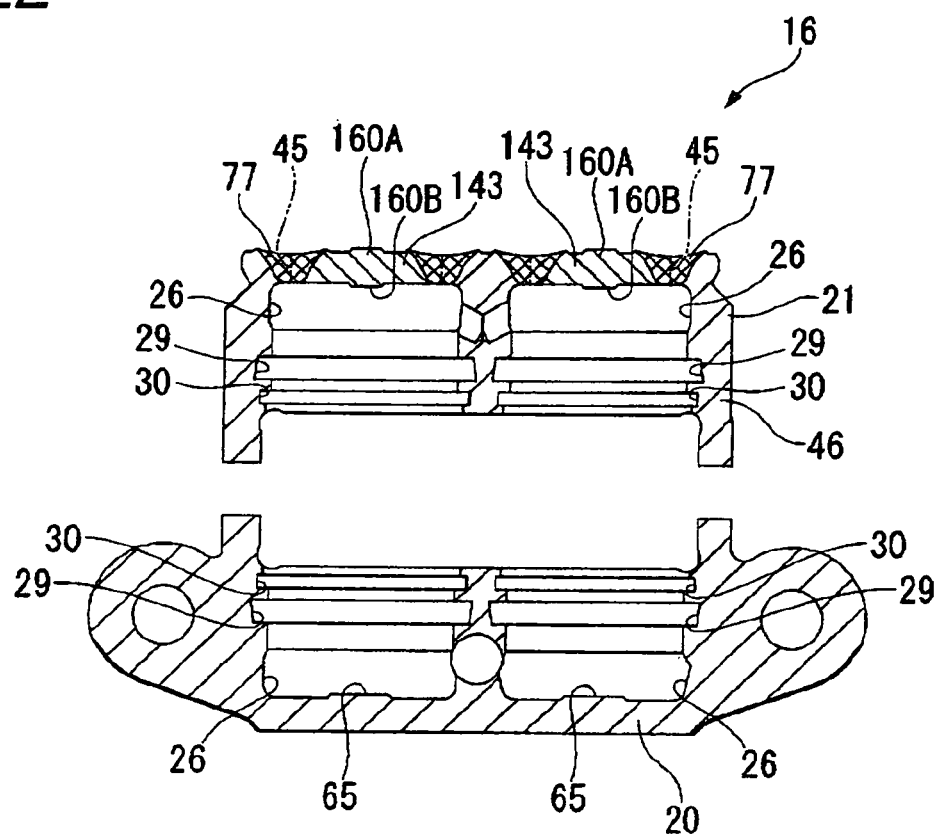
FIG. 22 is a sectional view of a caliper body in the second embodiment of the present invention before it is subjected to face cutting.

In the production of the caliper body 16, the cover member 143 is disposed in each opening 45 of the caliper body main part 46 (see FIG. 22) and temporarily fixed to the caliper body main part 46 by caulking. At this time, the cover member 143 may be disposed in any obverse-reverse orientation. There will be no problem regardless of which of the projections 160A and 160B faces inside the bore 26 when the cover member 143 is temporarily fixed. In FIG. 22, the cover member 143 is disposed such that the second projection 160 B faces inside the bore 26. When temporarily fixed to the caliper body main part 46, the cover member 143 is caulked while confirming that the first projection 160A in the center of the cover member 43, which is exposed to the outside, is coincident with the center of the opening 45.

Thereafter, friction stir welding is applied, as shown in FIG. 22, to the joint interfaces between the cover members 43 and the respective peripheral walls of the openings 45. Thereafter, the circular arc of each weld bead 77 resulting from the friction stir welding and the position of the first projection 160A of the associated cover member 143 are compared with each other to evaluate whether or not the friction stir welding has been performed along an appropriate locus.

Figure 23:
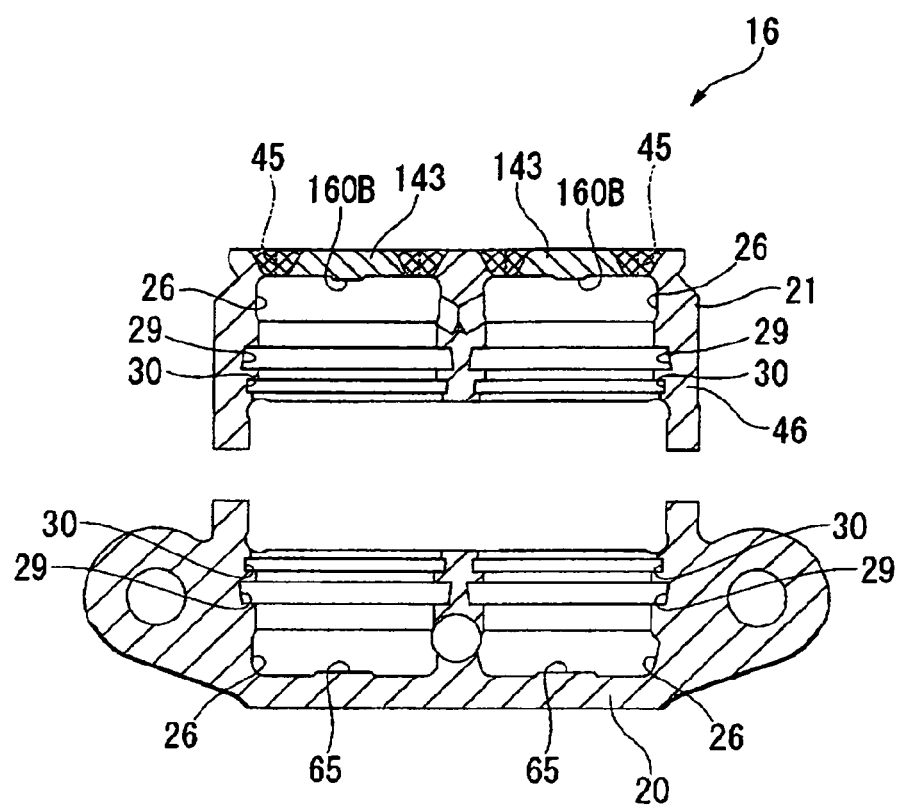
FIG. 23 is a sectional view of the caliper body in the second embodiment of the present invention after it has been subjected to face cutting.

Next, the opening 45-side bottom surface of the semi-fabricated product of the caliper body 16 is subjected to face cutting to remove, as shown in FIG. 23, the first projection 160A, which is located on the outer side of each cover member 143, from the bottom of the semi-fabricated caliper body 16, together with the weld beads 77 including burrs.

With the disk brake of this embodiment, the projection 160A or 160B, which is exposed to the outside, is cut off by face cutting performed on the bottom surface of the semi-fabricated caliper body 16. Therefore, the bottom surface of the caliper body 16 has nothing remaining thereon that enables distinction between the obverse and reverse sides of each cover member 143, but the other projection 160B or 160A is surely present on the side of each cover member 143 that faces inside the associated bore 26.

It should be noted that in the second embodiment also the method of joining the cover member is not necessarily limited to friction stir welding. For example, threads may be cut on the outer peripheral surface of the cover member and on the peripheral wall of the opening of the caliper body main part to join them by thread engagement.

The advantageous effects of the above-detailed second embodiment are as follows.

In the second embodiment, the present invention is applied to a method of producing a disk brake having a cylinder slidably accommodating a piston that presses a brake pad against a disk, in which the cylinder is formed from a plate-shaped cover member constituting the bottom of the cylinder and a cylinder body having an opening that is closed with the cover member, and in which the cover member is joined to the cylinder body to close the opening. According to the present invention, the disk brake producing method has the step of forming a first projection on one side of the cover member and a second projection on the other side of the cover member, the step of disposing the cover member such that the first or second projection faces inside the cylinder and, in this state, joining the cover member to the peripheral wall of the opening of the cylinder body, and the step of face-cutting the side of the cover member which faces outside said cylinder and the portion of the cylinder body that adjoins to the side of the cover member which faces outside said cylinder to remove burrs from the joint therebetween. Therefore, either of the first and second projections is surely present inside the cylinder no matter which side of the cover member is located inside or outside the cylinder body when the cover member is installed. The obverse-reverse orientation of the cover member will raise no problem. Accordingly, it is possible to dispense with the inspection regarding the obverse-reverse orientation of the cover member as installed. The step of joining the cover member to the peripheral wall of the opening of the cylinder body may be carried out by friction stir welding.

Further, in the second embodiment, the first or second projection facing outside the cylinder body is cut off by face cutting, and as a result, the side of the cover member which faces outside the cylinder and the portion of the cylinder body that adjoins to the side of the cover member which faces outside the cylinder are flush with each other. Therefore, it is possible to improve the appearance quality of the finished product. In the second embodiment, further, the cover member can be joined to the cylinder body without the need to care about the obverse-reverse orientation of the cover member as installed. Further, it becomes unnecessary to perform an inspection regarding the installed orientation of the cover member and hence possible to increase the production efficiency of the disk brake.

It should be noted that the present invention is not necessarily limited to the foregoing embodiments but can be modified in a variety of ways without departing from the gist of the present invention.

The present application claims priority under 35 U.S.C. section 119 to Japanese Patent Application No. 2007-274385, filed on Oct. 22, 2007. The entire disclosure of each of Japanese Patent Application No. 2007-274385, filed on Oct. 22, 2007 including specification, claims, drawings and summary is incorporated herein by reference in its entirety.

The Japanese Patent Application Public Disclosure No. 2007-10136 is incorporated herein by reference in its entirety.

What is claimed is:

1. A disk brake having a cylinder slidably accommodating a piston that presses a brake pad against a disk, said cylinder comprising a plate-shaped cover member constituting a bottom of said cylinder and a cylinder body having an opening that is closed with said cover member, said cover member being integrally joined to said cylinder body to close the opening, and, after said cover member has closed the opening, an opening-side end surface of said cylinder body is subject to face cutting to make the end surface flat,
wherein the cover member is joined to the cylinder body by friction stir welding,
wherein said cover member has a projection on one side of said cover member and a blind hole on the other side of said cover member, said cover member further comprises an outer peripheral surface which can be fitted into said opening at the same axial position with any of the one side and the other side facing an inside of said cylinder, before jointing of said cover member to said cylinder body,
wherein, after said friction stir welding of said covering member and said cylinder body, the projection of said cover member is positioned so as to face the inside of said cylinder,
wherein the blind hole is sized so as to be contained inside an inner circumferential edge of a circumference defined by weld beads formed by a welding tool during the friction stir welding between the cover member and the cylinder body,
wherein a circumferential wall and a bottom portion of the blind hole remains even after said face cutting of the weld beads, and
wherein the projection and the blind hole are circular in cross section, and the blind hole is smaller than the projection in diameter.

2. The disk brake of claim 1, wherein the projection and the blind hole are provided in a center of said cover member.

3. The disk brake of claim 1, wherein said outer peripheral surface of said cover member is formed so as to extend in an axially straight manner.

4. The disk brake of claim 1, wherein the blind hole is a cylindrical hole.

5. The disk brake of claim 1, wherein the blind hole is a conical hole.

6. A disk brake having a cylinder slidably accommodating a piston that presses a brake pad against a disk, said cylinder comprising a plate-shaped cover member constituting a bottom of said cylinder and a cylinder body having an opening that is closed with said cover member, said cover member being integrally joined to said cylinder body to close the opening, and, after said cover member has closed the opening, an opening-side end surface of said cylinder body is subject to face cutting to make the end surface flat,
wherein the cover member is joined to the cylinder body by friction stir welding,
wherein said cover member has a projection on one side of said cover member and a blind hole on the other side of said cover member, said cover member further comprises an outer peripheral surface which can be fitted into said opening at the same axial position with an of the one side and the other side facing an inside of said cylinder, before jointing of said cover member to said cylinder body,
wherein, after said friction stir welding of said covering member and said cylinder body, the projection of said cover member is positioned so as to face the inside of said cylinder,
wherein the blind hole is sized so as to be contained inside an inner circumferential edge of a circumference defined by weld beads formed by a welding tool during the friction stir welding between the cover member and the cylinder body,
wherein a circumferential wall and a bottom portion of the blind hole remains even after said face cutting of the weld beads, and
wherein the blind hole is a cross-shaped hole.

7. A method of producing a disk brake having a cylinder slidably accommodating a piston that presses a brake pad against a disk, said cylinder comprising a plate-shaped cover member constituting a bottom of said cylinder and a cylinder body having an opening that is closed with said cover member, said cover member being integrally joined to said cylinder body by friction stir welding to close said opening, said method comprising the steps of:
forming a projection on one side of said cover member, a blind hole on the other side of said cover member, and an outer peripheral surface which can be fitted into said opening at the same axial position with any of said one side and said other side facing an inside of said cylinder, the blind hole being sized so as to be contained inside an inner circumferential edge of a circumference defined by weld beads formed by a welding tool during the friction stir welding between the cover member and the cylinder body;

disposing said cover member such that the projection faces inside said cylinder and, in this state, integrally joining said cover member to a peripheral wall of said opening of said cylinder body by friction stir welding; and face-cutting said other side of said cover member and a portion of said cylinder body that adjoins said other side of said cover member such that a circumferential wall and a bottom of the blind hole remains, so as to remove burrs generated at the weld beads therebetween, wherein the projection and the blind hole are circular in cross section, and the blind hole is smaller than the projection in diameter.

8. The method of claim 7, wherein the blind hole is provided in a center of said cover member, said method further comprising:

a locus checking step carried out after said friction stir welding step to check whether or not a locus of friction stir welding is appropriately centered at the blind hole.

9. The method of claim 7, further comprising:

an inspection step carried out before said face-cutting step to check whether the blind hole remains on an outer surface of said cover member.

10. The method of claim 7, wherein the outer peripheral surface of said cover member is formed so as to extend in an axially straight manner.

11. The method of claim 10, further comprising:

an inspection step carried out after said face-cutting step to check whether the blind hole remains on an outer surface of said cover member.

12. The method of claim 10, wherein the blind hole is a cylindrical hole, said method further comprising:

a judging step carried out after said face-cutting step to judge from an angle of a bottom surface of the blind hole whether or not an angle of said cover member to said cylinder body is acceptable.

13. The method of claim 10, wherein said blind hole is a conical hole, said method further comprising:

a judging step carried out after said face-cutting step to judge from roundness of the blind hole whether or not an angle of said cover member to said cylinder body is acceptable.

* * * * *